April 12, 1960 — W. L. BENNINGHOFF — 2,932,041
FLOATING CHUCK
Filed Sept. 23, 1957 — 4 Sheets-Sheet 1

INVENTOR.
William L. Benninghoff,
BY John A. Leonard,
ATTORNEY.

April 12, 1960 W. L. BENNINGHOFF 2,932,041
FLOATING CHUCK
Filed Sept. 23, 1957 4 Sheets-Sheet 2
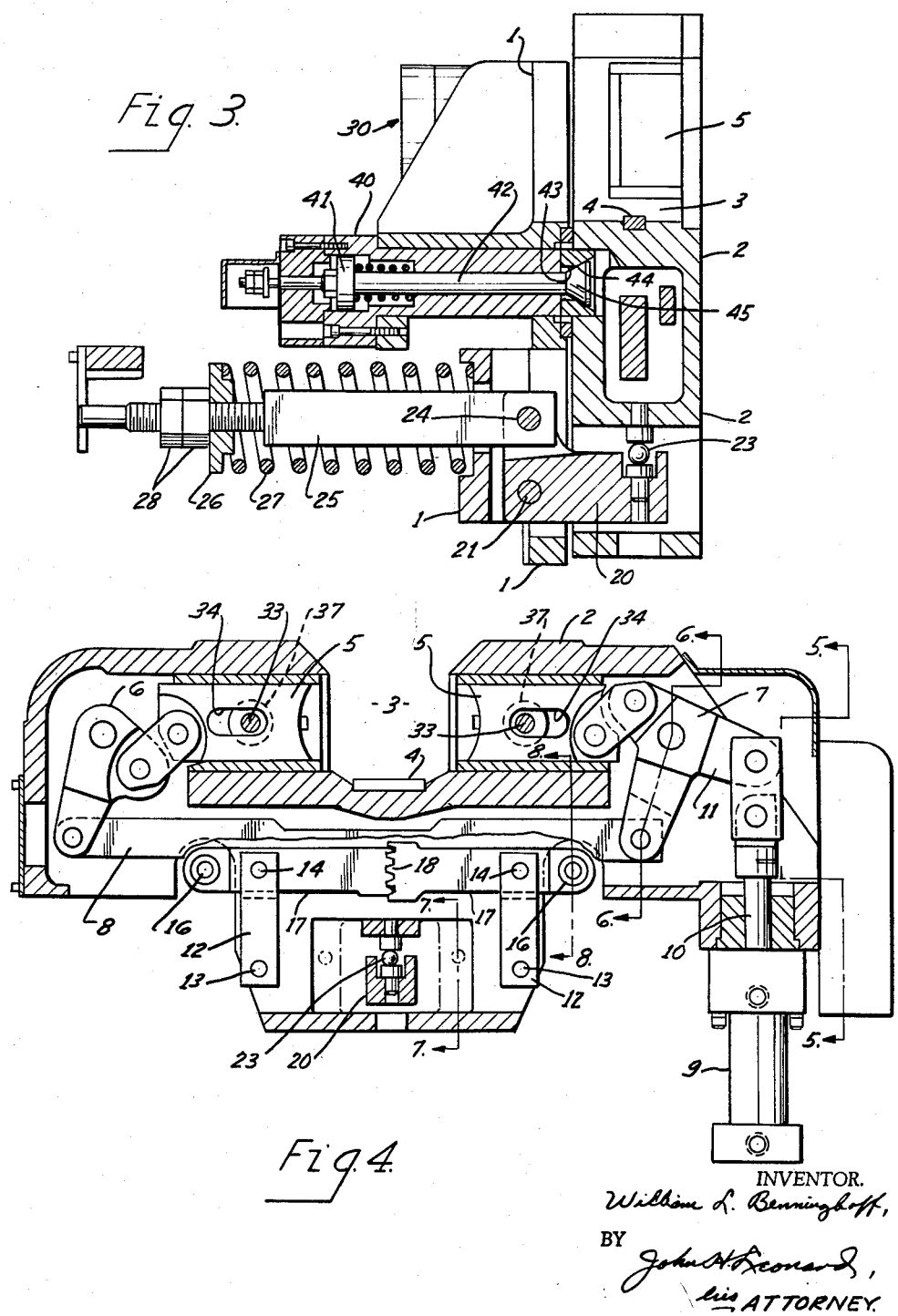
INVENTOR.
William L. Benninghoff,
BY John H. Leonard,
his ATTORNEY.

April 12, 1960 W. L. BENNINGHOFF 2,932,041
FLOATING CHUCK
Filed Sept. 23, 1957 4 Sheets-Sheet 3

INVENTOR.
William L. Benninghoff,
BY
John H. Leonard,
his ATTORNEY.

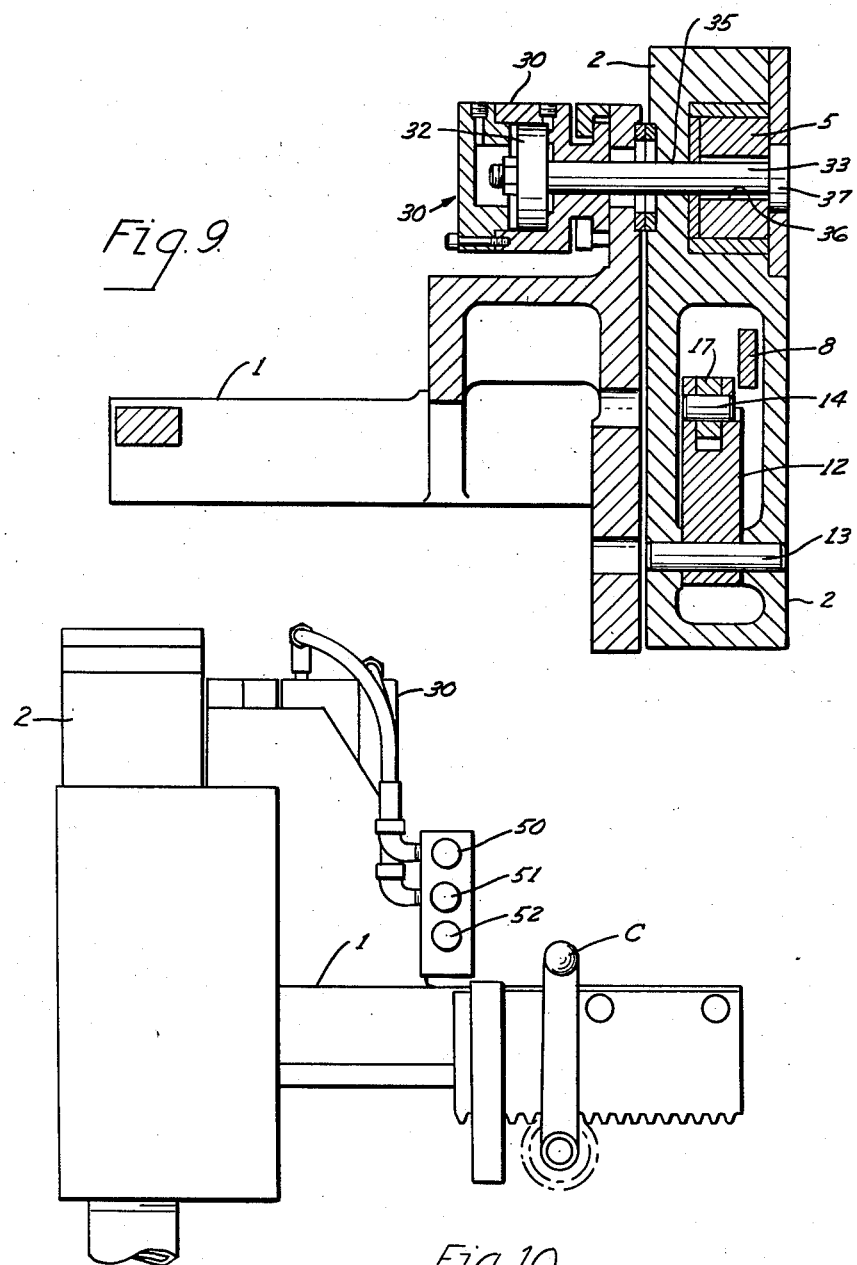

ated Apr. 12, 1960

2,932,041

FLOATING CHUCK

William L. Benninghoff, Willoughby, Ohio

Application September 23, 1957, Serial No. 685,739

7 Claims. (Cl. 10—107)

This invention relates to floating chucks and particularly to floating chucks of the type which is used for holding a workpiece securely in an adjusted position to which the piece has been moved by a work engaging tool during the initial engagement of the tool and workpiece.

More particularly, the present invention constitutes an improvement in the invention disclosed in U.S. Letters Patent No. 2,798,234, issued July 9, 1957, to William L. Benninghoff and Neil T. Sawdey.

For purposes of illustration, the present chuck will be described as used in connection with a pipe threading machine, its use with other types of machines being readily apparent from the illustrative example.

As more fully described in the above patent, in machines for performing taper cuts on the ends of pipes preparatory to threading the pipe ends, and in machines for cutting the threads, difficulties arise from the fact that the pipes are not always straight. For example, if a pipe having a bent end portion is supported by a stationary chuck which is coaxial with the thread cutting tool, the bent end of the pipe is eccentric to the tool. Accordingly, in order to support the pipe with the bent end coaxial with the tool, the chuck must be arranged initially for movement universally in a direction transversely of the pipe axis, so as to permit bringing the axis of the bent end portion of a pipe held thereby from a position eccentric to the axis of the cutting tool of the threading machine to an adjusted position as near as may be concentric thereto, and for securely clamping the pipe in the adjusted position preparatory to the threading operation. This adjustment is necessary to prevent the formation of threads which may not be the full depth or length on one side of the pipe and of undue depth or length on the other side, depending upon the degree of eccentricity.

The floating chuck described in the above identified patent comprises gripping jaws mounted in a floating frame which is supported for universal bodily movement along a plane normal to the axis of the thread cutting tool of the pipe threading machine, thus providing components of movement in all directions along the plane. As a result, when the jaws grip the pipe and before the frame is clamped, the pipe end can be brought into concentricity with the cutting tool by the initial engagement of the tool and pipe end. When thus brought into concentricity, the frame is clamped firmly in fixed position which remains unchanged throughout the threading operation.

In the patent, the floating frame is supported from beneath, for universal bodily floating movement along a vertical plane, by depending links which are connected at their lower ends to a pair of co-rotating eccentrics carried on parallel shafts and at their upper ends to the floating frame. The frame is counterbalanced by a suitable spring which is adjustable for supporting the frame and a pipe load thereon in substantially a central position, while leaving the frame free to be moved both laterally and vertically concurrently for adjustment to a proper position.

The disadvantage of the patented structure resides primarily in the fact that the floating frame is unstably supported from beneath, the points of connection of the links with the supporting means being beneath the level of their points of connection with the frame. As a result, the frame has an inherent imbalance which urges it to swing downwardly and laterally outwardly to one or the other of its extreme lateral positions, and thus to a position of maximum lateral and vertical eccentricity relative to the axis of the thread cutting tool. This inherent imbalance has to be positively overcome in all instances by the counterbalance.

In accordance with the present invention, this objection is eliminated and instead of the floating chuck frame being supported from beneath so that its tendency is to swing downwardly laterally under the influence of gravity into a position of extreme eccentricity relative to the thread cutting tool, the floating chuck frame is stably suspended by links from above, the points of connection of the links with the supporting means being above the level of their points of connection with the floating frame. As a result, the floating frame is stably suspended and has inherent balance so that, under the influence of gravity, its tendency is to swing downwardly and laterally inwardly toward a centered position transversely of the cutting tool and thus to a position of minimum lateral eccentricity with respect to the axis of the cutting tool.

A principal advantage, therefore, of the present invention is that the floating chuck frame is stably suspended as distinguished from unstably supported.

Another advantage resides in the fact that the means by which the floating frame is suspended, and the operating means for maintaining the points of suspension in the proper relations to each other, permit a greater spacing of the eccentric axes for the links from the axes of their supporting shafts and so provide more favorable leverage conditions. This likewise eliminates the necessity for the very precise and expensive eccentrics heretofore used and permits the use of less precise and more rugged eccentric cranks which are better adapted to withstand and resist the turning moments imposed on the floating frame and tending to turn in in its vertical plane due to the torque imposed on the pipe by the cutting tool.

Since the parts by which the present frame is suspended are simpler and less expensive, there is a material reduction in the cost of the entire workholding chuck assembly. The greater simplicity also contributes to ease of assembly.

The present floating chuck retains the advantages of that of the chuck provided in the above identified patent, including the centering means and the clamping means by which the floating frame, when once it has reached the proper position for accommodating the bent end of the pipe in concentric relation to the cutting tool, is clamped firmly in said position. The present chuck also may be operated by the conventional power actuating means such as disclosed in the above Patent No. 2,798,234.

Various other objects and advantages will become apparent from the following description wherein reference is made to the drawings showing a preferred embodiment of the present invention, and wherein:

Fig. 3 is a vertical, sectional view through the structure of Fig. 2, taken on the line 3—3 in Fig. 2;

Fig. 4 is a vertical, sectional view taken on the line 4—4 in Fig. 1;

Figure 2:
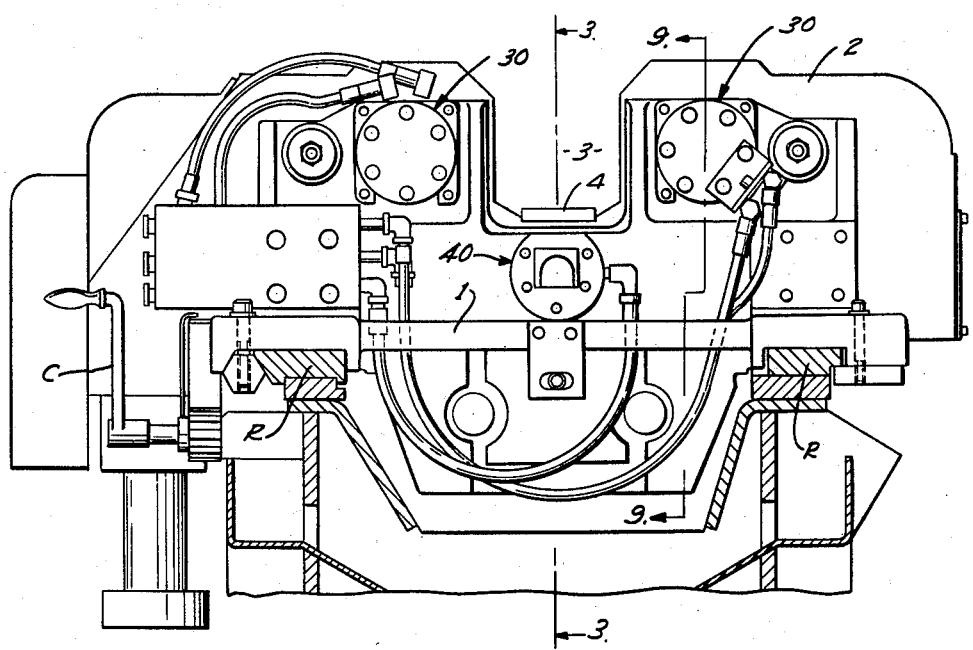
Fig. 2 is an elevation of the structure illustrated in Fig. 1; viewed facing toward the cutting tool of the pipe threading machine.
Figure 5:
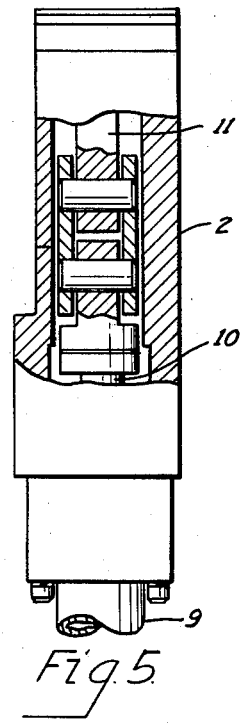
Fig. 5 is a fragmentary, vertical sectional view taken on the line 5—5 in Fig. 4.
Figure 6:
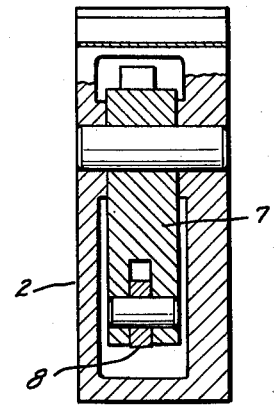
Fig. 6 is a vertical, fragmentary, sectional view taken on the line 6—6 in Fig. 4.
Figure 7:
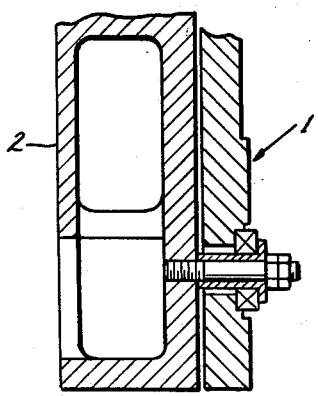
Figure 8:
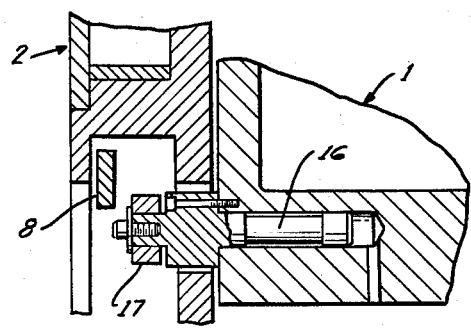

Figs. 7 and 8 are fragmentary, vertical, sectional views taken on the lines 7—7 and 8—8, respectively, in Fig. 4;

Fig. 9 is a vertical, sectional view taken on the line 9—9 in Fig. 2; and

Figure 1:
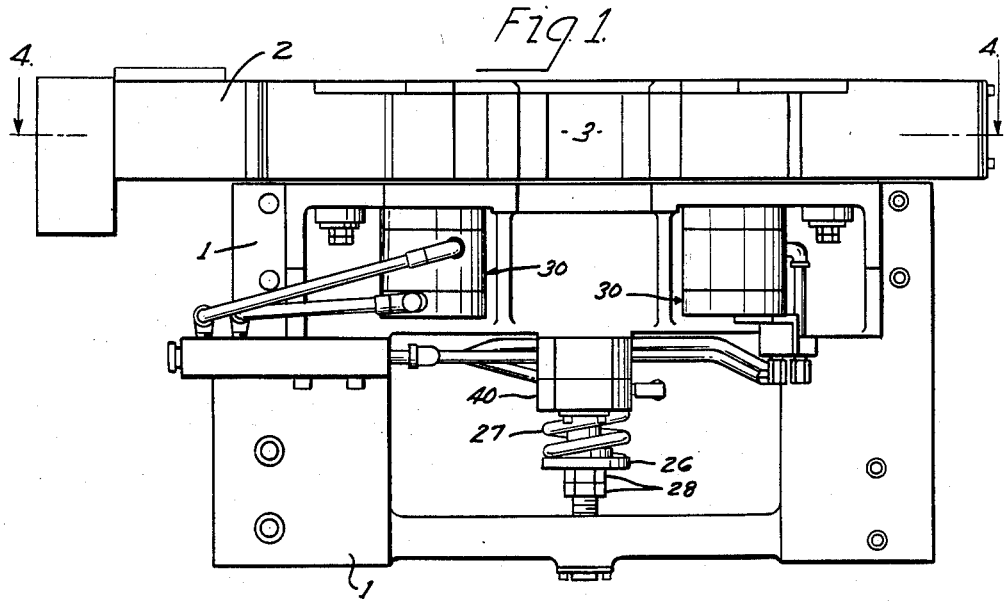
Fig. 1 is a top plan view of a chuck embodying the principles of the present invention.

Fig. 10 is a left end elevation of the structure illustrated in Figs. 1 and 2.

Referring to the drawings, the present structure is shown as mounted on the rails R of a threading machine in connection with which it is to be used. The chuck of the present invention comprises a main frame 1 which is mounted for movement along the rails R by means of a crank C so as to position the chuck in the proper forward and rearward relation to the pipe threading machine cutting tool.

Since, in most machines for pipe threading, the machine is arranged with the thread cutting tool rotatable about a horizontal axis, the present machine will be described in such relation. Mounted on the frame 1 for universal floating movement along a vertical plane is a floating frame 2 which is provided with an open throat 3 into which the pipe is lowered in a direction transversely of the pipe axis. The floating frame 2 is provided, at the base of the throat 3, with a rest 4 which is engaged by the bottom of the pipe as the pipe is lowered into the chuck. Mounted in the floating frame 2 are reciprocable clamping jaws 5 which are movable relatively toward each other for the purpose of engaging and clamping the periphery of the pipe firmly. The jaws 5 are operated by suitable rocker arm linkages 6 and 7, respectively, which are connected by a tie link 8 so as to constrain them to operate in fixed relation to each other as they are moved inwardly for gripping the pipe. The linkages are operated, in turn, by a reversible hydraulic piston and cylinder assemblage 9 having a piston rod 10 connected to a crank arm 11 of the rocker arm linkage 7. The admission and discharge of hydraulic pressure fluid may be controlled by a conventional solenoid valve which, in turn, is controlled by a suitable electric switch, as described in the above patent. As hereinbefore mentioned, it is desirable that the movable floating frame 2 be stably suspended from the frame 1 rather than unstably supported thereon. For this purpose, the frame 2 is suspended by suitable links 12, each of which is connected at its lower end to the floating frame 2 by means of a pivot 13 and at its upper end by means of a pivot 14. Thus the weight of the floating frame 2 tends to swing it downwardly, and concurrently inwardly laterally of the cutting tool about the axes of the pivots 14 so that the frame normally centers itself laterally of the tool in a stable suspended condition when unrestrained by extraneous forces.

The floating frame 2 is supported from the fixed frame 1 by means of suitable pivots 16 and crank arms 17, in the form of gear segments, which are rotatably mounted on the pivots 16. The arms 17 project from the pivots 16 toward each other and are provided with inter-meshing gears 18 by virtue of which they are constrained to move together throughout the same angle about the axes of their respective pivots 16. The pivots 14 are connected to the arms 17 in eccentric relation to the axes of the pivots 16, each pivot 14 preferably being the same distance from the axis of its associated pivot 16 as the other. The arms 17 preferably are so arranged that, in the lowermost position of the floating frame 2, the arms are horizontal and the pivotal axes of the pivots 16 lie in the same horizontal plane as the axes of the pivots 14. Preferably, each link 12 is of the same length so that the pivots 13 lie in the same horizontal plane when the frame is at rest under the influence of gravity.

As will hereinafter be more fully described, a counterbalance device is applied to the floating frame 2 for urging it upwardly and is adjustable so as to substantially counterbalance the weight of the frame and associated parts and the pipe loaded thereonto. Due to the intergearing of arms 17 by the gears 18, the floating frame 2 is constrained to move bodily parallel to its original position as it is lifted or lowered or moved laterally. Rocking and tilting of the floating frame 2 is substantially eliminated.

In the form illustrated, the stable suspension for the frame 2 is provided by securing the links 12 directly to the frame 2 and the arms 17 to the main frame 1 and to the links. However, it is apparent that the pivots 16 may be mounted in the floating frame 2 at the level of the pivots 13 and the links could extend upwardly therefrom and engage pivots mounted directly in the frame 1 at the same location as the pivots 14. This reversal of parts is not as desirable but would meet a number of the main objections to the earlier form of the structure.

In order to counterbalance the device, a suitable rocker arm 20 is mounted on the frame 1 so as to rock about the pivotal axis 21. Operably interposed between the arm 20 and the underside of the floating frame 2 is a suitable load transmitting ball 23. Pivotally connected to the rocker arm 20 in eccentric relation to the axis 21 by a pivot 24 is a tension arm 25. Operatively interposed between the frame 1 and an adjustable abutment 26 on the arm 25 is a compression spring 27. The position of the abutment 26 may be adjusted endwise of the arm 25 by means of suitable lock nuts 28, thus varying the compression in the spring 27 and therefore the lifting force on the ball 23. Accordingly, in operation, the weight of the floating frame 2 and a particular size pipe to be gripped by the chuck jaws are substantially counterbalanced so that the end of the pipe can be moved very readily into proper coaxial relation to the cutting tool as the cutting tool initially engages the end of the pipe.

It is to be noted that in the present structure the axes of the two lower pivots 13 and two upper pivots 14 define a rectangle when the floating frame is in its lowermost position. This rectangular or parallelogram relation is preferred along with the pivots 14 being spaced equidistantly from the axes of the pivots 16. However, the total movement of the frame 2 is not great, being possibly a total of one inch. Accordingly, therefore, it is not essential that the frame 2 shift wholly without tilting as a slight amount of tilt is not objectionable. For example, if the frame is raised by rotating the arms 17 so that their intergeared sections swing upwardly, from a horizontal position, then the axes of the pivots 13 and 14, after the upward movement, define an inverted isosceles trapezoid, the lefthand link, in Fig. 4, sloping outwardly upwardly to the left, and the righthand link 12 sloping outwardly upwardly to the right. If, then, the floating frame 2 should be shifted slightly to the right, then the lefthand link would tend to cause its pivot 13 to rise and the righthand link would tend to cause its pivot 13 to lower slightly, thus moving the frame 2 slightly out of parallelism with its original position. However, as mentioned, this tilting movement of the frame is so slight that this is not an appreciable factor and therefore extreme precision is not necessary.

As mentioned, in the above identified patent, it is desirable not only that the frame 2 be clamped firmly into adjusted position when it has been moved to the proper adjusted position by initial engagement of the end of the pipe by the cutting tool, but also that the clamping grip of the jaws on the pipe be firmly maintained. For this dual purpose, as described in the above patent, suitable hydraulic or pressure operated means are provided for clamping the floating frame 2 in firm face to face juxtaposition with the stationary frame 2 and concurrently for clamping the jaws firmly in position relative to the floating frame 2. For this purpose, the structure illustrated in Figs. 1, 2 and 9 may be employed.

As there illustrated, two hydraulic piston and cylinder assemblages 30 are mounted in laterally spaced relation on the main frame 1 at opposite sides of the throat 3. Each assemblage includes a cylinder 31 and a piston 32 having a rod 33 and so arranged that pressure-operating fluid can be introduced in the cylinder at the rod end of the piston. Each piston rod 33 extends with substantial clearance through a suitable elongated slot 34 in the frame 1 and, in turn, through bores 35 in the floating frame 2, and enlarged passages 36 in the gripping jaws 5. The cylinders are mounted to float radially relative to the frame 1. The piston rods 33 extend entirely through the jaws 5 and, at their outer ends, are provided with enlarged heads 37 which can bear against the faces of the jaws 5 opposite from the frame 1. Thus, when pressure fluid is introduced at the rod end of the cylinder 30, the cylinders are drawn firmly against the frame 1 and concurrently the piston rods 33 are operated to pull the heads 37 towards the frame 1. Since these heads engage the jaws 5 and the jaws 5, in turn, engage the floating frame 2 in face to face relation, this action clamps the jaws 5 into firm binding relation with the frame 2 and the frame 2 into firm binding relation to the frame 1, thus clamping both the jaws and the floating frame firmly in place. The passages 34 in the frame 1 are adequate to permit lateral movement of the floating frame 2 and piston and cylinder assemblages 30 transversely relative to the axis of the piston rod 33. The passages 36 in the jaws are large enough for movement of the piston rod 33 relative to the jaws transversely of the axis of the rod 33.

As mentioned, it is desirable that the floating frame 2 be locked firmly in position during loading and preparatory to starting the threading operation. For this purpose, there is provided on the frame 1 a fluid pressure operated cylinder 40 in which is provided a piston 41 having a rod 42. The rod 42 extends through the end face of the frame 1 adjacent to the floating frame 2 and through a suitable bore 43 in the frame 2. The bore 43 joins with a bore 44 which is frustoconical with its larger base disposed away from the frame 1. On the end of the rod 42 is a complementary frustoconical head 45 which is arranged so that its frustoconical surface can engage the frustoconical surface defining the bore 44. When the frame 2 is free for floating, the fluid pressure is admitted to the left end of the cylinder 40, in Fig. 3, so as to urge the piston to the right, thus moving the head 45 away from a seated position in the bore 44. Due to the clearance between the bore 43 and the rod 42 and the clearance afforded between the frustoconical head 45 and the bore 44, the frame 2 is free to float. However, when the pressure fluid is admitted to the rod end or right-hand end of the cylinder, in Fig. 3, the cylinder is retracted, firmly seating the frustoconical head 45 in the bore 44. Due to the camming action of the frustoconical surfaces, the floating frame 2 by this latter action is brought back to an original position in which the frustoconical head 45 is coaxial with the bore 44.

The means herein described for clamping the jaws 5 and the floating frame 2 firmly in position and for centering the floating frame after it is released are fully described in the above identified Patent No. 2,798,234 and the specific structure thereof forms no part of the present invention. As illustrated in Fig. 10, the admission and control of pressure fluid supplied to the cylinders 9, 30 and 40 may be controlled remotely by suitable solenoid valves which, in turn, are controlled by suitable electric switches. Also, as illustrated in Fig. 10, three such switches are provided, one switch 50 being operable to operate the clamps for clamping the clamping jaws and floating frame 2 firmly in position. A second switch 51 being operable to operate the clamping jaws with respect to the pipe, and a third switch 52 being operable to control the centering device.

In the operation of the chuck, assuming the apparatus is in proper position with respect to the thread cutting machine, a pipe is lowered into the throat 3 until it engages the rest 4. During this operation, the floating frame is held in centered position by the engagement of the bore wall 44 and frustoconical head 45. Next, the cylinders 9 are operated to close the clamping jaws into firm clamping engagement with the pipe and, thereupon, the cylinder 40 is operated to release the centering means so that the frame 2 is free to float with the jaws 5 in firm clamping engagement with the pipe.

Since the frame is counterbalanced for its own weight and that of the pipe, the eccentric end of the pipe can readily be moved into coaxial relation to the cutting tool by the initial engagement therewith of the tool itself as the tool is advanced toward the pipe.

The cutting tool engages the pipe and starts a thread which is concentric with the end of the pipe, even though the end of the pipe is eccentric to the main body of the pipe. The pipe, by virtue of floating movement of the frame, thus is centered by the tool in proper position. When it is centered in proper position, the assemblages 30 are operated to clamp the floating frame 2 firmly against the frame 1 and the jaws 5 firmly against the floating frame, thus locking the jaws 5, frame 2, and stationary frame 1 firmly together so as to form a substantially unitary structure. The parts are held in this relative position until the threading operation is completed whereupon, after the thread cutting tool has been retracted from the pipe end, the assemblages 30 are operated to release the clamping pressure, and thereupon the pipe can be removed and the centering device operated to restore the floating frame 2 to its original centered starting position.

If desired, a semi-automatic or automatic control such as described in the above entitled patent may be used for causing the operation of the various parts in sequence.

It will be seen from the foregoing description that the improved floating chuck has adequate floating movement to assure proper alignment of the pipe and of the cutting tool if the eccentricity of the pipe end, relative to the axis of the main body of the pipe, is within any reasonably acceptable limit. At the same time, after the cutting operation has been initiated, the pipe is held rigidly in position more effectively than would be possible by the ordinary non-floating type of chucks in which the chuck jaws are not rigidly clamped to their support. The normal tendency of the frame 2 is to adjust itself laterally toward centered position rather than, as in the above patent, to fall downwardly to one side or the other of a vertical center line of the throat 3 to a position of extreme lateral eccentricity.

It is to be noted that whereas in the patent structure the eccentricity of the eccentrics to which the supporting links for the floating frame are connected are necessarily limited to a very small amount of eccentricity. This resulted in relatively poor torque resistance during the threading operation. In the present structure, since the eccentricities of the pivots 14 relative to the axes of the shaft 16 are quite large, much better leverage is provided in resisting the torque on the floating frame 2 and the tendency of the frame 2 to be rotated about the pipe axis by the cutting tool.

Having thus described my invention, I claim:

1. A work gripping chuck including a fixed frame, a movable frame, gripping jaws supported on the movable frame, supporting means for supporting the movable frame on the fixed frame for movement in a vertical plane, both vertically and horizontally, concurrently, a counterbalancing means interposed between the fixed and movable frames for counterbalancing the work loaded movable frame, means for locking the movable frame against movement relative to the fixed frame, said supporting means comprising co-rotatable members on the fixed frame, means drivingly interconnecting the co-rotatable members and constraining them to rotate concurrently in opposite directions relative to each other about parallel rotational axes, links pivotally connected to the members, respectively, each link being connected to its associated member for swinging about a pivotal axis parallel to and eccentric to the rotational axis of its associated member so that both links move together either upwardly or downwardly upon co-rotation of the members, said links depending from said members and being pivotally connected at their lower ends to the movable frame for swinging relative thereto about axes, respectively, which are parallel to said rotational axes and are spaced apart from each other, respectively, and said links supporting the movable frame in suspension from said members.

2. The structure according to claim 1 characterized in that said rotatable members comprise gear segments, and are rotatable about said rotational axis, respectively, and are intermeshed with each other.

3. The structure according to claim 1 characterized in that said rotatable members comprise crank arms extending radially of said rotational axes, respectively, generally toward each other.

4. The structure according to claim 1 characterized in that the members are mounted on the fixed frame, and the links are connected to the members at the upper ends of the links and to the movable frame at the lower ends of the links.

5. The structure according to claim 1 characterized in that the axes of rotation of the rotatable members define a fixed horizontal plane, and the axes of the pivotal connections of the links thereto define a horizontal plane disposed very close to said fixed horizontal plane in all operating positions of the movable frame.

6. The structure according to claim 1 characterized in that the rotational axes lie in a fixed common horizontal plane, the axes of the pivot connections of the links with the supporting means lie in shifting common horizontal planes with each other in all rotated positions of the shafts, and the axes of the pivotal connections of the links with the movable frame lie in shifting common horizontal planes below the level of said first mentioned shifting planes.

7. A work gripping chuck including a fixed frame, a movable frame, gripping jaws supported on the movable frame, supporting means for supporting the movable frame on the fixed frame for movement, parallel to a vertical plane, both vertically and horizontally, concurrently, counterbalancing means interposed between the fixed frame and movable frame for counterbalancing the work loaded movable frame, means for locking the movable frame against movement relative to the fixed frame, said supporting means comprising a pair of members mounted on one of the frames for rotation about parallel axes spaced apart laterally from each other in the same horizontal plane and at right angles, respectively, to said vertical plane, a pair of links pivotally connected to the members, respectively, for swinging about pivotal axes parallel to said rotational axes, each pivotal axis being spaced the same distance from the rotational axis of its associated member, means inter-connecting the members and constraining them, when they are rotated, to rotate through the equal angles, said pivotal connections with the links being arranged so that, in the starting position of the members they are in the same horizontal plane, pivot means for the links, respectively, pivotally connecting the links to the other of the frames for swinging relative thereto about axes parallel to said rotational axes, and each the same distance from its other pivotal axis, and the pivotal axes of the links being positioned so that the links support the movable frame by suspension.

References Cited in the file of this patent

UNITED STATES PATENTS

| | | |
|---|---|---|
| 1,967,507 | Hibbard | July 24, 1934 |
| 2,798,234 | Benninghoff | July 9, 1957 |